March 1, 1938.  H. E. TWOMLEY  2,109,581
BOX NAILING MACHINE
Filed April 3, 1935  8 Sheets-Sheet 1

Inventor
Herbert E. Twomley
By Lyon & Lyon
Attorneys

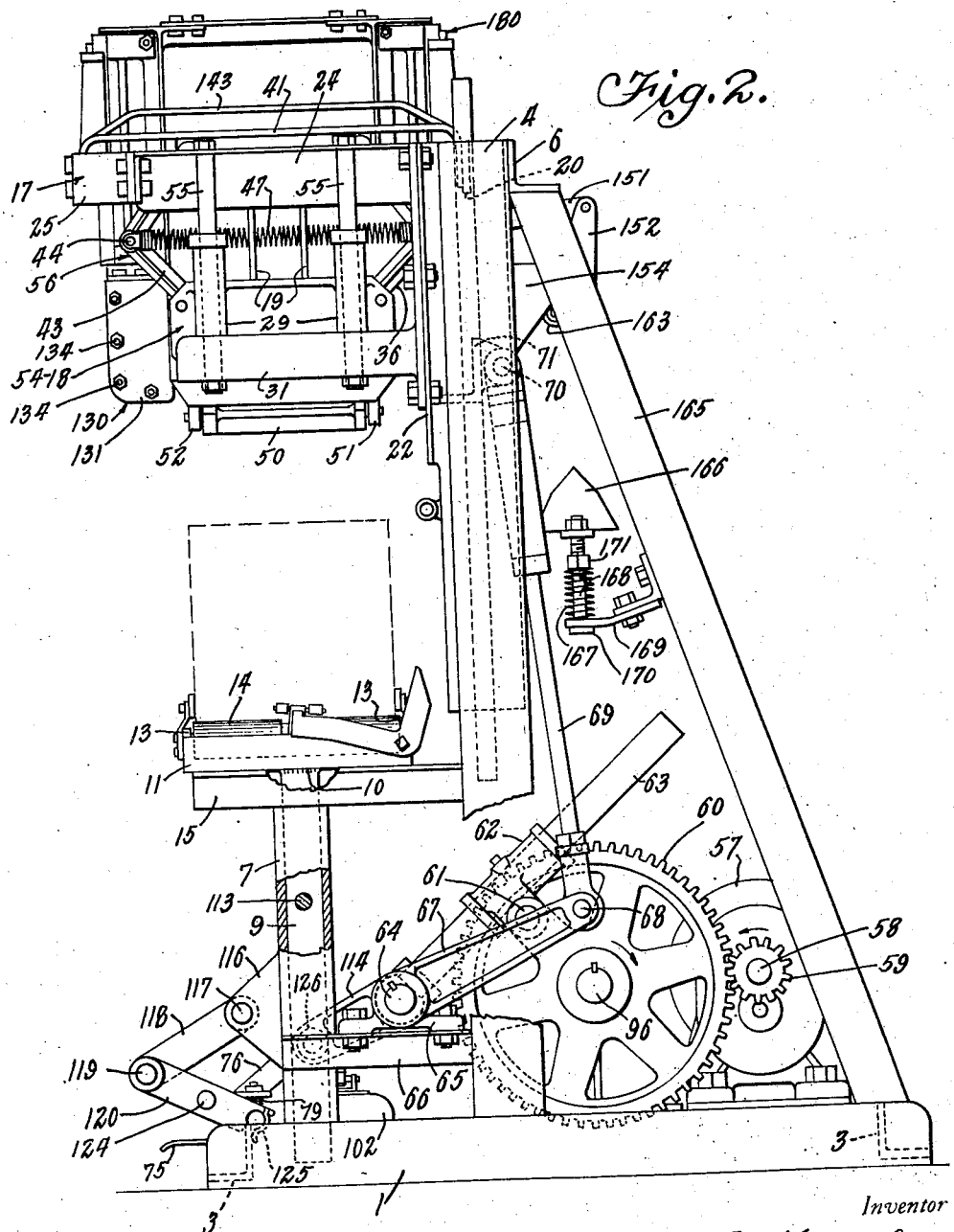

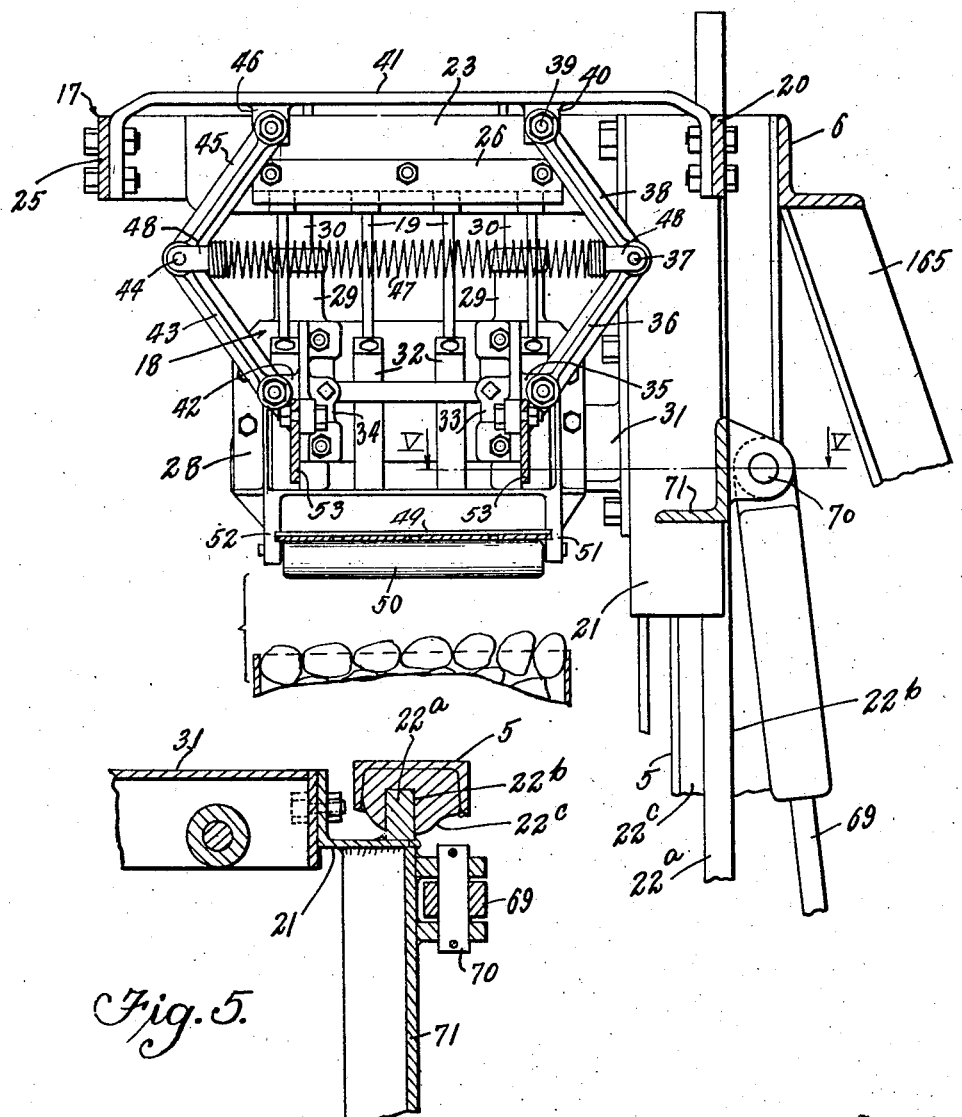

March 1, 1938. H. E. TWOMLEY 2,109,581
BOX NAILING MACHINE
Filed April 3, 1935 8 Sheets-Sheet 4
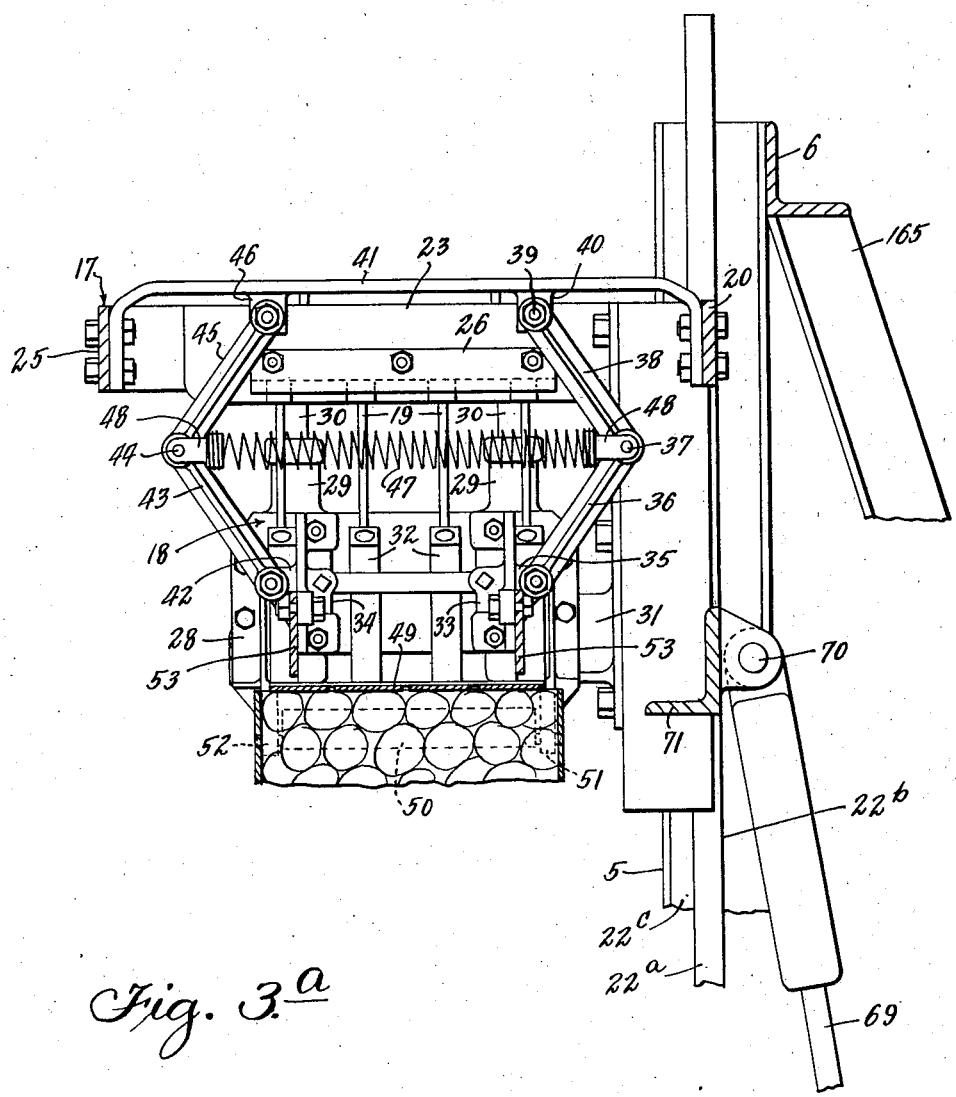
Fig. 3.ᵃ
INVENTOR.
Herbert E. Twomley
BY Lyon & Lyon
ATTORNEYS March 1, 1938. H. E. TWOMLEY 2,109,581
BOX NAILING MACHINE
Filed April 3, 1935    8 Sheets—Sheet 5
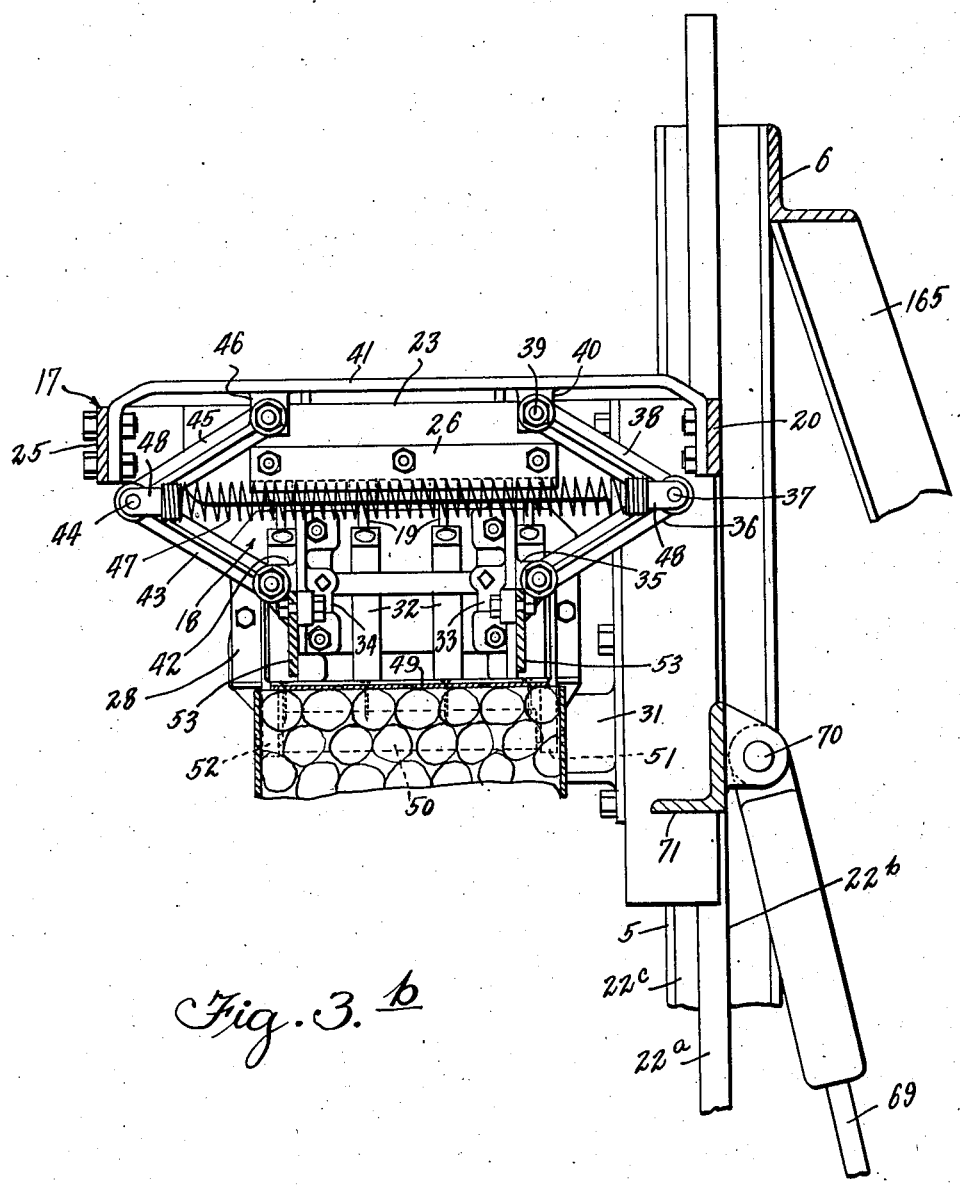
Fig. 3.b
INVENTOR.
Herbert E. Twomley
BY Lyon & Lyon
ATTORNEYS

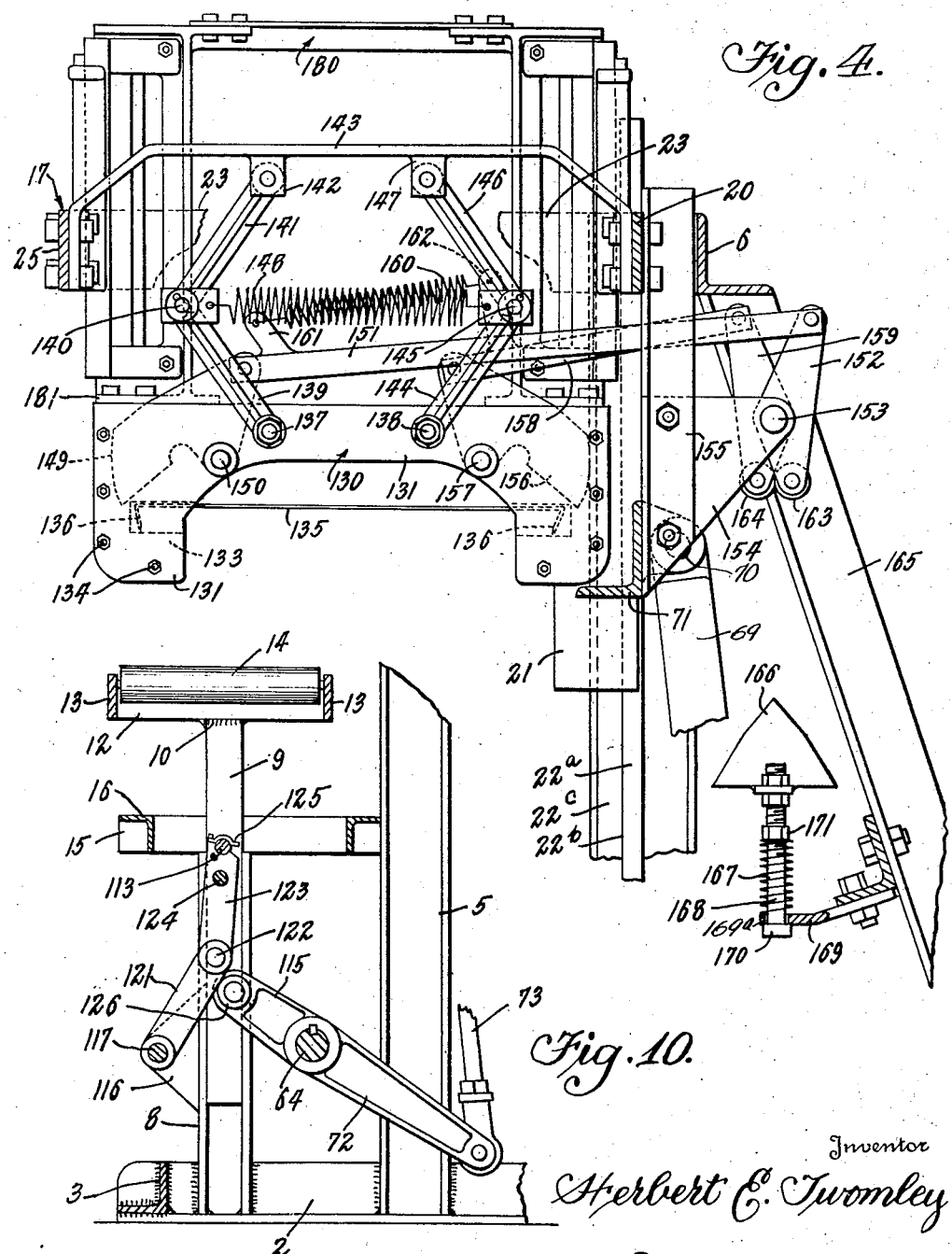

March 1, 1938.     H. E. TWOMLEY     2,109,581
BOX NAILING MACHINE
Filed April 3, 1935     8 Sheets-Sheet 7
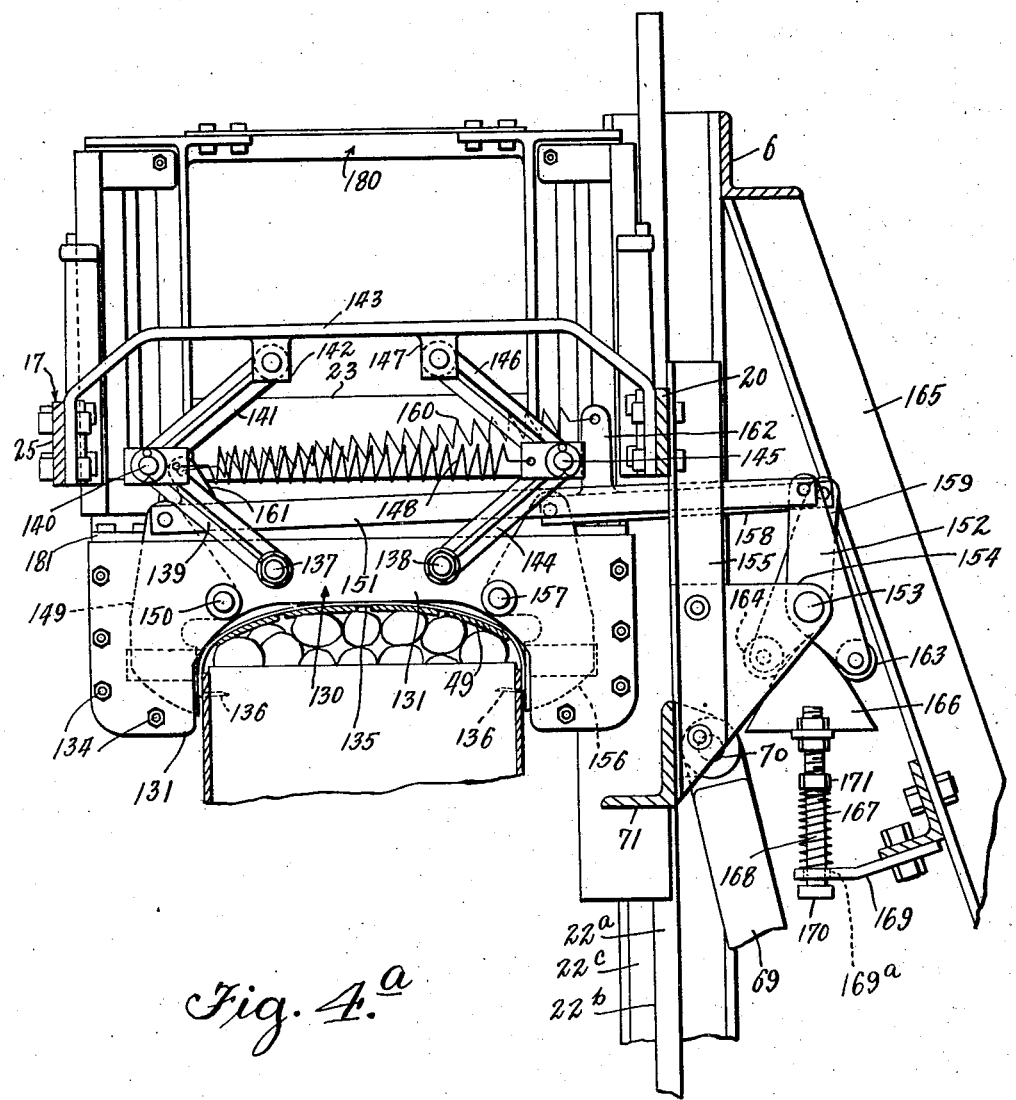
Fig. 4.ᵃ
INVENTOR.
Herbert E. Twomley
BY Lyon & Lyon ATTORNEYS March 1, 1938.  H. E. TWOMLEY  2,109,581
BOX NAILING MACHINE
Filed April 3, 1935  8 Sheets-Sheet 8
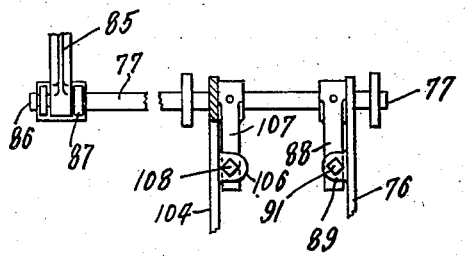
Fig. 9.
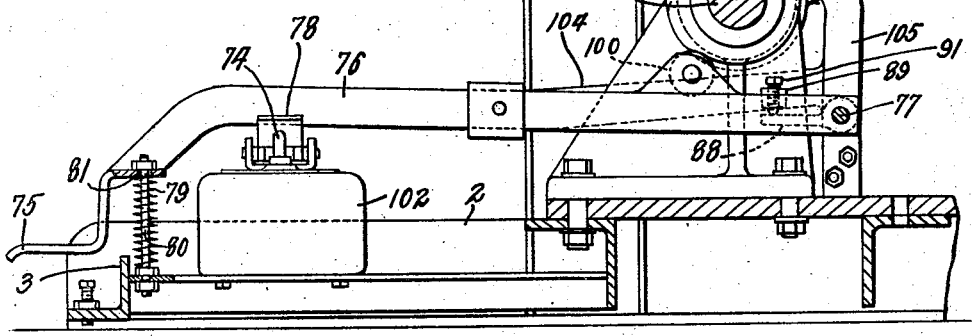
Fig. 6.
Fig. 7.
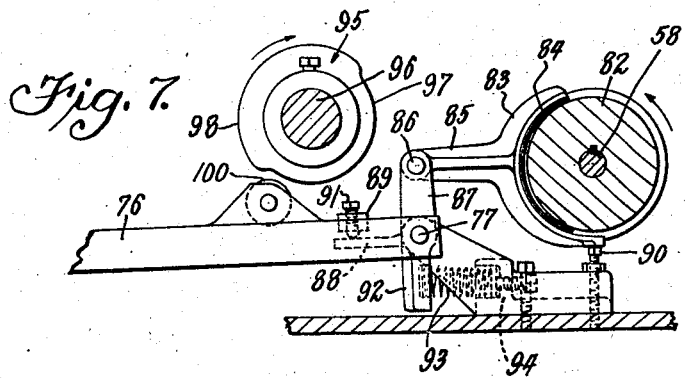
Fig. 8.
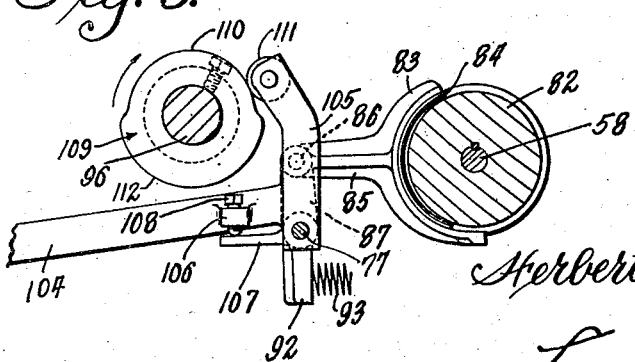
Inventor
Herbert E. Twomley
By Lyon & Lyon
Attorneys Patented Mar. 1, 1938

2,109,581

UNITED STATES PATENT OFFICE 2,109,581

BOX NAILING MACHINE

Herbert E. Twomley, Riverside, Calif., assignor, by mesne assignments, to Food Machinery Corporation, a corporation of Delaware Application April 3, 1935, Serial No. 14,496

20 Claims. (Cl. 1—10)

My invention relates to machines for applying lids to boxes and similar containers, and has particular reference to machines adapted to apply lids to overfilled fruit or vegetable boxes wherein it is necessary that the cover or lid applied to the boxes must bulge above the level of the side walls of the box to accommodate the overpacked or protruding contents of the box.

In the packing of certain articles of commerce, particularly the packing of fruits and vegetables and similar products, it has been the practice to fill a box with the desired contents, permitting a portion of the contents to extend above the level of the sidewalls of the box, and then apply a cover of relatively thin material over the extending or protruding contents of the box, securing the cover to the box by bringing the ends of the cover down into contact with the ends of the box and nailing the same thereto while the central portion of the cover is permitted to bulge upwardly to accommodate the extending or protruding contents of the box, and applying a strap or other binder across the bulging center of the cover to draw the same down upon the protruding contents and prevent dislodgment of the contents during transportation and storage of the completed package.

In connection with the citrus industry, it is essential that the packaging of oranges, grapefruit or other citrus fruits shall be such that the fruit shall, when placed in the box, extend a considerable distance above the sidewalls of the box so that when pressure is applied to the cover to press the same down upon the box the bulged central portion of the cover will accommodate the extending fruit and will exert a compressive force upon the fruit, tending to compress the same down into the box while the strap, which is applied across the central portion of the cover, further tends to compress the fruit to compensate for the natural shrinkage of the fruit as it is transported and stored prior to actual use.

Various machines have been proposed for the purpose of applying lids and straps to boxes of the character set forth above, which include, generally, a pressing mechanism which will engage the ends of the cover disposed over the filled box and press the ends of the cover down into contact with the box ends, with suitable nailing mechanism arranged immediately above the box ends to drive nails into and through the cover ends and into the box ends to secure the cover to the box. Also, machines have been devised for applying straps across the center of the box, which machines consist, essentially, in a suitable compression shoe which engages the central portion of the cover of the box and presses the same down upon the protruding fruit, shaping the cover laterally into a substantial arch, and while holding the cover under such compression, a wire or band strap is applied across the cover and secured to the sidewalls of the box. However, machines which have been heretofore used for these purposes have depended for their pressing operations upon the movement of the pressing mechanism through a predetermined distance to bring the same into contact with the box ends, the pressure exerted upon the cover ends being dependent upon the height of the overpack and upon the dimensions of the box. The only compensation which has been made in such machines is that of interposing springs between certain of the driving elements required for the pressing operations to permit them to yield if the resistance to the pressing operations exceeds the force exerted by the spring. Such arrangements, however, are unsatisfactory, since, if the spring is sufficiently strong to accomplish the desired pressing operations it must also be so strong that it is likely to cause the pressing elements to injure the box parts or the fruit before the yielding operation takes place. Further, the resistance encountered which is sufficient to cause functioning of the springs will be opposed by a constantly increasing force as the springs are compressed, and, while a small yielding effect is obtained, such yielding operation is defeated by the constantly increasing forces due to the spring.

It is, therefore, an object of my invention to provide a machine of the character set forth in which the pressing elements of the machine are so mounted that they can exert only a predetermined force upon the cover or the contents of the box.

Another object of the invention is to provide a machine of the character set forth in which the pressing elements of the machine are mounted to yield under resistance to the pressing forces, the yielding being resisted by forces which remain constant irrespective of the amount of yielding.

Another object of the invention is to provide a machine of the character set forth in which the pressing elements are mounted so as to exert a predetermined fixed pressure upon the box cover or contents of the box.

Another object of the invention is to provide a machine for applying lids to boxes in which the machine is readily adapted to operate upon boxes of different dimensions.

Another object of the invention is to provide a machine for applying lids to boxes in which the same motive power which is applied for applying the lids to the boxes is employed for adjusting the machine to operate upon boxes of differing dimensions.

Another object of the invention is to provide a machine for applying lids to boxes in which a link and spring assembly is employed for suspending the pressing elements of the machine, which link and pressing mechanism will exert a predetermined pressing force upon said pressing elements independent of the movement of the pressing elements.

Another object of the invention is to provide a strapping machine for applying straps across the covers of boxes adapted to exert a fixed pressure upon the cover independent of variations in the amount of overpack of the contents of the box.

Another object of the invention is to provide a machine for applying lids to boxes in which the lid-pressing and nailing operations may be accomplished at a relatively low speed while the return of the pressing and nailing mechanisms to their retracted positions upon the completion of the nailing operations may be accomplished with considerably greater speed.

Another object of the invention is to provide for applying lids to boxes in which the box and lid-pressing, nailing and strapping mechanisms are brought toward each other at a relatively low speed to accomplish the lidding or strapping operations while the movement of the box and lid-pressing, nailing or strapping mechanisms away from each other after the lidding or strapping operations are complete, may be accomplished with great rapidity.

Other objects and advantages of the invention will be apparent from a study of the following specifications, read in connection with the accompanying drawings, wherein Figure 1 is a front, elevational view of a lid-pressing, nailing and strapping machine constructed in accordance with my invention;

Fig. 2 is a side, elevational view of the machine illustrated in Fig. 1;

Fig. 3 is a detail, sectional view, taken along line III—III of Fig. 1, illustrating the lid-pressing and nailing mechanisms in the rest position of the machine, just prior to the start of a cycle of operations of the machine for lidding and strapping a box;

Fig. 3a is a sectional view similar to Fig. 3 illustrating the lid pressing and nailing mechanisms in the intermediate position in the cycle of operations and showing the lid pressing operation just prior to nailing;

Fig. 3b is a sectional view similar to Figs. 3 and 3a illustrating the positions of the lid pressing and nailing mechanisms during the nailing operation;

Fig. 4 is a detail, sectional view, taken along line IV—IV of Fig. 1, illustrating the strap-applying mechanism in the rest position immediately prior to the operation of the machine to apply a strap to a box;

Fig. 4a is a sectional view similar to Fig. 4 illustrating the position of the strap-applying mechanism assumed at the time the nailing operation of the nailing elements of the machine are actuated;

Fig. 5 is a detail, sectional view, taken along line V—V of Fig. 3, illustrating the manner of reciprocably mounting the movable pressing and nailing mechanisms on the machine;

Fig. 6 is a detail, sectional view of the power controlling apparatus employed in connection with the machine shown in Figs. 1, 2, 3, and 4;

Fig. 7 is a detail, sectional view, similar to Fig. 6, illustrating the control apparatus of the machine in the position assumed immediately upon the actuation of the controlling pedal for the machine;

Fig. 8 is a view similar to Fig. 7, illustrating the manner of actuating the controls for reversing the operation of the machine after the machine has been set into operation;

Fig. 9 is a detail view illustrating the relation of the controlling pedals with each other and with a brake-actuating mechanism; and Fig. 10 is a detail view illustrating the mechanism for adjusting the machine for operation with boxes differing in dimension from the standard box for which the machine is designed.

Figure 1:
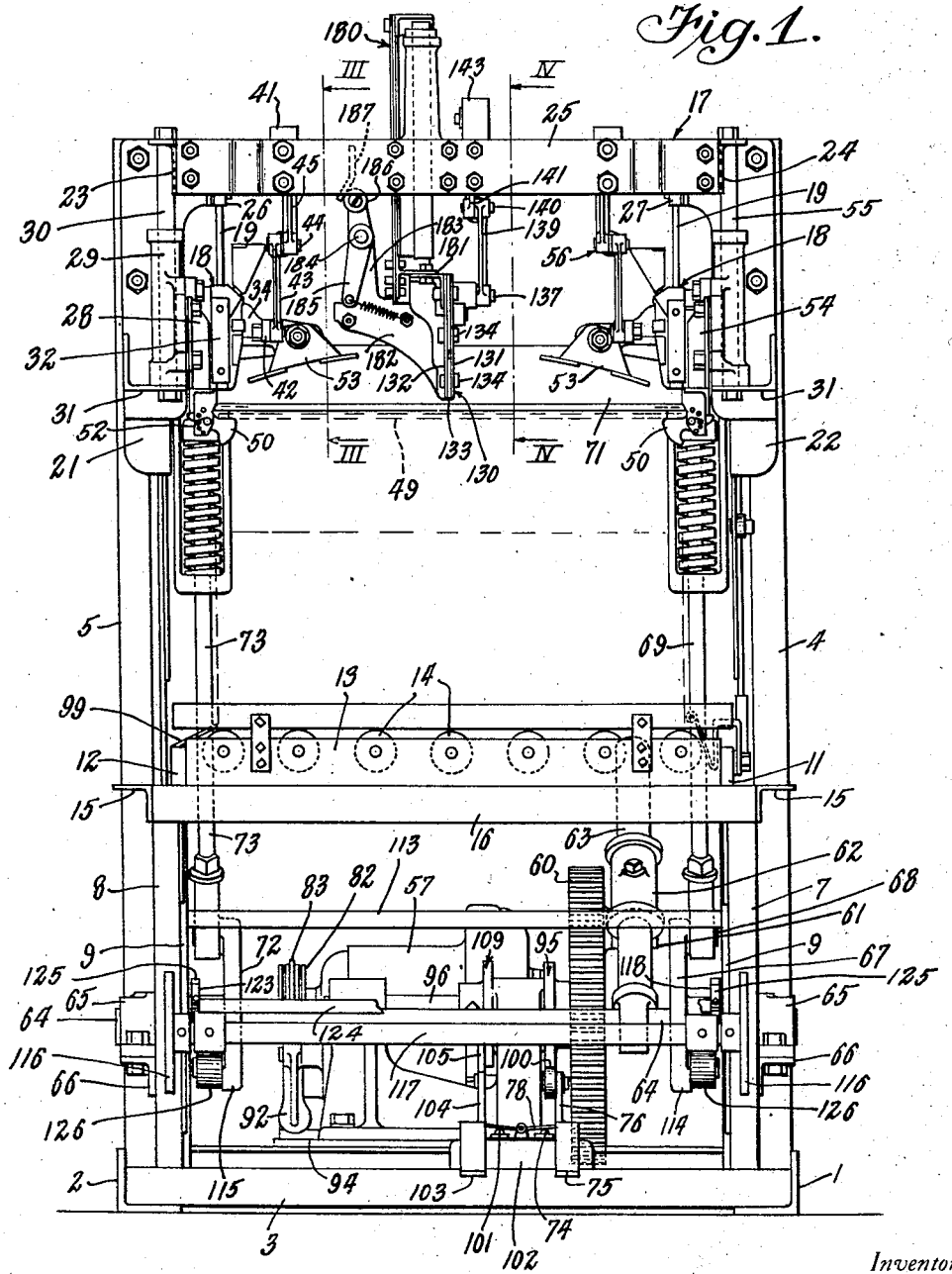

Referring to the drawings, I have illustrated my invention as embodied in a box-lidding and strapping machine particularly adapted to apply covers to overfilled orange boxes, or boxes in which other citrus fruits may be packed, though it will be understood by those skilled in the art that the machine illustrated and described herein is equally adaptable to the lidding of boxes for any desired contents, and particularly wherein the contents protrude above the top level of the box prior to the application of the lid thereto.

The machine comprises a suitable base formed from a pair of foot members 1 and 2 at opposite sides of the machine and connected across the front and back of the machine by suitable cross bars 3 which may be formed of any suitable material, preferably fabricated steel structural members, such as angle iron. Rising vertically from the foot member 1 is an upright 4 constituting a vertical rail on which the lid-pressing, nailing and strapping apparatus may be reciprocably mounted. Similarly, at the opposite side of the machine, arising from the foot member 2, is an upright 5. The uprights 4 and 5 may be, and are preferably, formed from a section of channel iron or steel. The uprights have their upper ends connected together by means of a cross bar 6 to form the uprights and foot members into a substantially rigid rectangular structure extending in the vertical direction.

Also mounted upon the foot member 1, (see Fig. 2) slightly in advance of the upright 4, is a short upright 7, while a similar upright 8 is mounted upon the foot member 2 at the opposite side of the machine. The uprights 7 and 8 constitute guideways in each of which operates a bar 9, the upper end of the bar 9 at one end of the machine secured as at 10 to a cross tie 11, while the bar 9, at the opposite end of the machine is similarly connected to a cross tie 12. The cross ties 11 and 12 constitute the end members of a substantially rectangular frame, the side rails 13 of which constitute bearing members in which are rotatably mounted a plurality of rollers 14 upon which boxes to be lidded may be moved into and out of the machine. The rectangular frame formed by the members 11, 12, and 13 with the rollers 14, constitutes a section of roller conveyer which may constitute a continuation of a suitable feeder conveyer by which the boxes are moved from the packing tables toward the lidding and strapping machine by mounting the lidding and strapping machine in the line of the feeder conveyer.

The rectangular frame 11, 12, and 13 is normally seated upon a stationary supporting structure including end bars 15 at opposite ends of the machine, interconnected by means of horizontal rails 16 all supported by and secured directly to the uprights 7 and 8.

Thus in the normal operation of the machine the rectangular frame 11, 12, and 13 constitutes a nailing table upon which boxes to be lidded may be received and which will support the boxes in position during the time the lids are applied to or nailed to or strapped upon the boxes, this nailing table being supported by the supporting structure 15 remains at the same level during the normal operation of the machine upon boxes of a given height and thus constitutes a stationary nailing table toward which the lid-pressing, nailing and strapping elements may be moved in accomplishing the lidding and strapping operations, except as will be hereinafter described when the nailing table may be lifted from its normal position to an elevated position to adapt the machine to apply lids to boxes of less height.

The lid-pressing and nailing mechanism includes, essentially, a reciprocating frame 17 from which is suspended a nail chuck assembly 18 and nail driving punches 19.

The frame 17 (see Fig. 3) is illustrated as being formed of a substantially rectangular frame, including a back rail 20 to which is secured a vertical bearing member 21 at one end of the machine, and 22 at the opposite end of the machine. Extending horizontally from the bearing member 21 is a bracket 23, while a similar bracket 24 is secured to the bearing member 22, the forward ends of the brackets 23 and 24 being secured together by means of a front rail 25. Each of the bearing members 21 and 22 is provided with a slide rail 22a, which extends vertically and is received in vertical bearing grooves 22b formed in a metal filler 22c secured to the inner surface of the uprights 4 and 5.

The left-hand end of the frame 17 constitutes a cross head structure for supporting lid-pressing and nailing mechanism for the left-hand end of a box, having secured to the bracket 23, a nail punch support 26 from which a plurality of nail punches 19 extend downwardly, the nail punches 19 having enlarged heads which are secured to the support 26 in the manner commonly employed to secure nail punches to their operating driving heads. Similarly the right-hand end of the frame 17 constitutes a cross head upon which a nail punch support 27 is secured to the bracket 24 and likewise suspends a plurality of nail punches 19 extending vertically therefrom.

The nail chuck assembly at one end of the machine is suspended immediately below the nail punch support 26 and includes a nail chuck and lid engaging frame 28 having tubular guide bearings 29 thereon slidably mounted upon bearing rods 30 secured in turn directly to the bracket 23. The lower end of the bearing rods 30 extend through and are secured to a secondary bracket 31 secured to the bearing member 21 and extending parallel to the bracket 23.

Secured upon the inner face of the chuck frame 28 are a plurality of nail chucks 32, one of which is aligned immediately below the nail punches 19 in the normal position, as shown in Fig. 3, and extending into its associated nail chuck 32. Thus by movement of the nail chuck frame 28 relative to the cross head 17 the nail punches 19 will be driven downwardly through the nail chucks to drive nails therethrough or the nail punches 19 will be retracted through the nail chucks 32 ready for the next nailing operation.

The relative movement between the nail chuck frame 28 and the cross head 23 is accomplished by yieldingly mounting the nail chuck frame 28 upon the cross head 17, as by securing to the inner face of the nail chuck frame 28 a pair of laterally extending suspension brackets 33 and 34, the suspension bracket 33 having a rearwardly extending lug 35 formed thereon to pivotally mount one end of a toggle link 36. The opposite end of the toggle link 36 is pivotally secured at 37 to the free end of a second toggle link 38, the opposite end of which is secured at 39 to a downwardly dependent lug 40 as formed upon a cross strap 41 secured at its opposite ends to the rear bar 20 and the front bar 25 of the cross head assembly.

The suspension bracket 34 likewise has a forwardly extending lug 42 which pivotally mounts one end of a toggle link 43, the free end of which is pivotally secured as at 44 to the free end of a toggle link 45, the opposite end of which is secured to a lug 46 depending downwardly from the cross strap 41. The pivotal points of the free ends of toggle links 36, 38 and the pivotal point of the free ends of toggle links 43, 45, are interconnected by means of a tension spring 47 normally under tension to draw the midpoints of toggle links 36, 38 and 43 and 45 toward each other. The spring 47 may be secured to the pivot points 37 and 44 by any suitable means, as by means of a clevis 48 secured to the end of the spring 47.

The mounting of the nail chuck frame 28 by means of the opposed toggle links 36, 38, and 43, 45, normally urged toward each other by means of the spring 47, as described, constitutes a yielding mounting between the cross head 17 and the nail chuck assembly in which the force required to cause the yielding between the nail chuck assembly and the cross head to occur may be set or adjusted at any desired value by determining the tension of the spring 47. This force may be adjusted to any desired value, though I prefer to adjust the tension of the spring such that when the cross head 41 is moved downwardly to bring the nail chucks 32 into contact with the ends of the cover the spring 47 and toggle links 36–38 and 43–48 will exert sufficient force to spring the cover ends down into contact with the box ends without permitting any yield between the nail chucks 32 and the cross head 41. Thus the nail chucks 41 constitute cover-pressing mechanism which will spring the ends of the cover down over the protruding fruit until the ends of the cover come into contact with the box ends in nailing position ready to have the nails driven into and through the ends of the cover. This position of the nail chucks, spring and toggle links is illustrated in Fig. 3, wherein the ends of the cover 49 have been brought down into contact with the ends of the box. Then as the cross head 41 continues its downward movement, the nail chucks 32, resting slidably against the ends of the cover which are now in contact with the ends of the box, cannot move to a further downward position and the nail chucks will therefore act as a cover-holding means to hold the cover tightly in contact with the ends of the box, while the now descending nail drivers 19 are forcing the nails through the chucks and into and through the ends of the cover until the cross head 41 has been moved down to the position shown in Fig. 3b, representing the finish of the nailing operation.

However, as the nail chuck assembly and the cross head 17 are moved toward each other, the midpoint of the toggle links 36, 38 will tend to move outwardly away from the midpoint of the toggle links 43, 45, and, similarly, the midpoint of the toggle links 43, 45 will move outwardly away from the midpoint of the toggle links 36, 38. This relative movement of the toggle links 36, 38 from the toggle links 43, 45 will tend to further stretch the spring 47, thus increasing the force exerted by this spring. However, the force exerted by the spring will be applied to the nail chuck assembly 28 through the toggle links 36 and 43 which will be moved to more acute angular positions relative to the nail chuck frame 28. By plotting the horizontal and vertical forces exerted through the toggle links 36 and 43, it will be observed that as the nail chuck assembly 28 approaches the cross head 17 the vertical component of the forces exerted by the spring 47 will be greatly reduced and by selecting the length of the toggles 36, 43 so proportioned to the strength of the spring 47, the vertical component of the force exerted by the spring on the nail chuck frame 28 may be reduced by an amount which substantially equals the increased tension of the spring 47. Thus the maximum amount of vertical force which can be exerted upon the nail chuck frame 28 to compress covers down upon the box ends may be adjusted by the initial tension on the spring 47 and irrespective of the distance through which the cross head moves in bringing the nail chuck frame 28 into contact with the end of the cover and driving the nails through the cover, the pressure which is exerted by the nail chuck frame on the cover cannot vary or exceed the predetermined amount for which the spring 47 has been selected.

It will also be observed that while the cross head 17 may be moved through the same distance upon each of its operations, the chuck frame 28 can never exert more than a predetermined force upon the cover and upon the box upon which it is operating. Thus the pressing operations may be accomplished by the movement of a single cross head 17 to spring the cover ends down over the overpacked or protruding fruit to bring the cover end into contact with the box ends with only a predetermined pressure exerted upon the cover, which pressure will not be increased should the overpack be greater in one box than in another box operated upon. The main advantage, however, is the fact that the strain on the machine assembly and the power required to press the cover down is not increased during the nail driving operation.

The nail chuck frame 28 may be employed to initially support the covers 49 prior to their application to the box and may also support suitable tucking mechanisms 50 which may operate to tuck in or press in the protruding fruit at the end of the box prior to the springing of the cover ends down upon the box ends. For this latter purpose, the chuck frame 28 is provided with a pair of downwardly extending lugs 51 and 52 between which is pivotally mounted the tucker 50 so arranged as to extend below the ends of the cover 49 and projecting inwardly of the position of the end boundaries of a box when such box is in nailing position in the machine to be brought into contact with the protruding fruit at the ends of the box as the chuck frame 28 is moved down toward the box. As the chuck frame 28 continues its movement, the tucker 50 (now projecting inwardly beyond the end of the box) will be engaged by the end of the box and rotated upwardly about its pivotal mounting to roll the tucker 50 from its position between the cover ends and box ends and thus permit the cover ends to spring down into contact with the box ends. Also the forwardly extending brackets 33 and 34 may be employed for the mounting of additional press shoes 53 spaced from the nail chucks 32 to engage the cover between its extreme ends and the center thereof to assist in the shaping of the cover as it is bowed down over the extending or protruding fruit.

It will be observed that at the opposite end of the machine a similar nail chuck frame 54 is provided mounted upon vertical rods 55 corresponding in all respects to the nail chuck frame 28 and its mounting upon the rods 30. Similarly, the nail chuck frame 54 is provided with a similar toggle link and spring assembly indicated generally by the reference character 56 corresponding in all respects to the toggle link and spring mounting for the nail chuck frame 28 to mount the nail chuck frame 54 at that side of the machine for the same relative movement and to exert the same constant compressive forces, irrespective of the movements of the cross head 17 relative to the nail chuck frame 54.

With the nail chuck frames 28 and 54 secured to the cross head 17, as described, a single movement of the cross head 17 toward the box supporting table 11, 12 and 13 will first move the tuckers 50 down until they engage the extending fruit at the ends of the box, then as the tuckers move further down they will contact the ends of the box and be rolled upwardly and outwardly around their pivot mountings 51 and 52 until they clear the ends of the box, at which time the nail chucks 32, which are now pressing the ends of the cover, will spring the cover ends down into contact with the box ends and then, by further downward movement of the cross head 17, the nails will be driven by the nail punches 19 into and through the cover ends and into the box ends to secure the cover to the box, while return upward movement of the cross head 17 will first elevate the nail punches 19 until the bearing members 29 abut upon the bracket 31 and then further forward movement of the cross head 17 will lift the chuck frames 28 and 54 away from the now lidded box, freeing the box for movement out of the machine.

The cross head 17, as hereinbefore described, is slidably or reciprocably mounted upon the uprights 4 and 5 and is arranged to be moved through a cycle of operations from its normal elevated position as shown in Fig. 1, down toward the box supporting table 11, 12, 13 to complete the pressing and nailing operations, and then back to its elevated position as shown in Fig. 1, by means of suitable power apparatus which includes a motor or similar prime mover 57 (Fig. 2) which may be mounted in any suitable position upon the base of the machine. The motor shaft 58 drives a pinion 59 which is meshed with a gear 60 having a laterally extending crankpin 61 pivotally mounting a sleeve 62.

The sleeve 62 is slidably assembled upon a cylindrical drive bar 63 rigidly and radially secured to a drive shaft 64 extending longitudinally of the machine and journaled in suitable bearings 65 at opposite ends of the machine which are in turn mounted upon cross braces 66 extending between the uprights 4 and 7 and uprights 5 and 8, respectively. Thus one complete rotation of the gear 60 in the direction indicated by the arrow on the gear shown in Fig. 2, from its normal rest position as shown in Fig. 2, will cause the drive shaft 64 to be moved in a clockwise direction during substantially 240° of such revolution, while during the remaining 120° of said revolution the shaft 64 will be moved in a counter-clockwise direction.

By referring particularly to Fig. 1, it will be observed that near the right-hand end of the drive shaft 64 there is rigidly secured to the drive shaft a lever 67 having one arm thereof extending rearwardly of the machine to be pivotally engaged as at 68 with the lower end of a connecting rod 69. The upper end of the connecting rod 69 is pivotally secured as at 70 to an angle bar 71 secured between the bearing members 21 and 22 on the cross head 17. Thus the movement of the drive shaft 64 first in a clockwise direction and then in a counter-clockwise direction will be transmitted through the lever 67 and through the connecting rods 69 to first move the cross head 17 downwardly toward the box-supporting table 11, 12, and 13 and then upwardly away from the box-supporting table to return the cross head 17 to its normal elevated position. A lever 72 is similarly rigidly secured to the drive shaft 64 near the opposite end thereof and is connected by a connecting link 73 to the angle bar 71 at the side of the machine opposite the connection of the connecting rod 69.

By reason of coupling the gear 60 to the drive shaft 64 through the sleeve 62 and the slide bar 63, it will be observed that one complete revolution of the gear 60 will move the cross head 17 downwardly and then back to its normal position, the downward movement occurring at a relatively low speed; that is, with the gear 60 rotating at a constant speed throughout one revolution. The downward movement of the cross head 17 will occur during 240° of the revolution of the gear 60, while the re-elevation of the cross head 17 to its normal position will occur during the final 120° of movement of the gear 60, this return movement occurring at a greatly increased speed over the speed of downward movement of the cross head 17. It will also be observed that by reason of the connection of the gear 60 to the slide bar 63 that the greatest leverage is exerted by this connection during the downward movement of the cross head 17 thus providing for the pressing forces which are necessary to draw the cross head 17 and the nail chuck frames 28 and 54 down against the resistance of the box, its contents, and its cover and also with sufficient force to insure the driving of the nails through the cover and into the box ends, while the return movement of the cross head 17, constituting merely the lifting of the cross head, the nailing mechanism and the pressing mechanism to a position free of the box, may be accomplished at the higher speed, at which time the leverage provided by the coupling of the gear 60 to the slide bar 63 will be much reduced. It is thus possible to take advantage of the harmonic motion produced by such coupling mechanism to move the cross head slightly during that portion of its operation when it is performing its greatest work, i. e. the pressing operations and the nailing operations while the remaining portion of the cycle of movement of the cross head 17 is accomplished at the higher speed, freeing the box rapidly from the machine after the completion of the lidding operations.

The motor 57 may be controlled in any suitable manner to apply power to the gear 60 whenever it is desired to perform a lidding operation upon a box. However, I prefer to arrange a switch 74 in circuit with the motor 57, arranged to be closed to start the motor 57 only when it is desired to perform a lidding operation.

The switch 74 may be suitably controlled, as indicated in Fig. 6, by means of a foot pedal 75 constituting one end of a foot lever 76. The lever 76 extends forwardly and rearwardly of the machine and is pivoted upon a rod 77 near the rear of the machine. The foot lever 76 extends immediately above a switch plate 78 pivotally mounted above the switch 74 so that when the foot pedal 75 is depressed by an operator of the machine the switch plate 78 will be rotated about its pivot to depress and close the switch 74. A suitable spring 79 may be employed to normally hold the foot pedal 75 and foot lever 76 in its normal or elevated position, the spring 79 being illustrated as surrounding a bolt 80 rigidly secured to the frame of the machine and passing through an opening 81 in the foot pedal 75.

Since it is desired that the gear 60 should always come to rest at the completion of one operation of the machine with the parts in the position shown in Figs. 1 and 2, namely with the cross head 17 in its normal elevated position, I arrange a brake for the motor 57 which will apply a braking force thereto to the motor whenever the foot pedal 75 is released.

By referring particularly to Figs. 7 and 9, it will be observed that the brake apparatus includes a brakedrum 82 secured upon the motor shaft 58 upon which may bear a brake-shoe 83 having a suitable brake-lining 84 thereon to engage the drum. The brake-shoe 83 is illustrated as having an arm 85 extending forwardly of the machine to pivotally engage, as at 86, with an upstanding lever 87 rigidly secured to the rod 77. The rod 77 is also provided with a forwardly extending lever 88 rigidly secured thereto, the lever 88 projecting parallel to the longitudinal axis of the foot lever 76 and disposed immediately below a laterally extending lug 89 formed upon or secured to the foot lever 76. Thus whenever the foot lever 76 is depressed to close the switch 74 to start the motor, such depression of the lever 76 will cause a depression of the lever 88, partially rotating the rod 77 and drawing the brake-shoe 83 out of engagement with the brake-brum 82. The lower surface of the brake-shoe 83 is adapted to slide rearwardly and forwardly of the machine and normally rests upon a slide bearing, illustrated herein as constituting the head of an adjusting screw 90 by which the brake-shoe 83 may be properly centered relative to the brakedrum 82.

The distance through which the brake-shoe 83 will move upon the depression of the foot lever 76 may be regulated by means of a suitable adjusting screw 91 extending through the lug 89 into engagement with the lever 88. Also, the amount of pressure which is exerted upon the brake-shoe 83, tending to apply it to the brake-drum 82, may be controlled by forming an extension 92 on the lower end of the lever 87 and interposing a brake-spring 93 between this extending end of the lever 87 and some stationary portion of the machine illustrated as an abutment 94—(see Fig. 7).

Since it is essential that the gear 60 must be stopped when the parts of the machine have arrived at the positions shown in Figs. 1 and 2, I provide a cam 95 upon the shaft 96 upon which the gear 60 is mounted, the cam 95 having a low level 97 thereon which will permit the foot lever 76 to return to its elevated position when the cam 95 has arrived in the position shown in Figs. 6 and 7. The cam 95 may also be provided with a high level 98 extending about a portion of its periphery to prevent return of the foot lever 76 to its normal or motor-stopping position if the operator should release the same immediately before the gear 60 has completed its revolution.

In the lidding of a box with the parts of the machine thus far described, the box will be brought toward the machine over any of the usual conveyor systems employed in packing houses to convey boxes from the packing tables to the lidding machine. The box may then be drawn onto the nailing table 11, 12, and 13, preferably being stopped in a central position with the box ends aligned directly below the nail chucks 32 at opposite ends of the machine by means of a suitable stop 99. A cover 49 may then be placed above the box, preferably by permitting the same to rest upon the inwardly extending tuckers 50. The operator may then depress the pedal 75, closing the switch 74 and starting the motor 57 which will, by rotation of the gear 60, draw the cross head 17 down toward the box. The initial downward movement of the cross head 17 will move the nail chuck frames 28 and 54 downwardly, carrying the tuckers 50 downwardly to engage any overhanging fruit at the ends of the box and pressing such fruit inwardly of the ends of the box until these tuckers are engaged by the ends of the box and are rotated thereby upwardly and outwardly to positions out of alignment with the ends of the box. At this time the cover will no longer be supported by the tuckers 50 but at this time the downward movement of the nail chuck frames will have been such that the cover will now rest upon the overpack or fruit extending above the level of the box. When the cover rests upon the overpack, or fruit extending above the top level of the box, it will be engaged by this fruit so that considerable pressure must be applied to the ends of the cover in order to spring them down into contact with the box ends. This pressing operation is accomplished by the continued downward movement of the cross head 17 bringing the nail chucks 32 down upon the ends of the cover, the pressure exerted being determined by the tension of the spring 47. Continued downward movement of the cross head 17 presses the nail chucks down upon the cover ends and moves the cover ends down toward and finally into contact with the ends of the box ready for nailing.

During the pressing of the cover down into contact with the box ends, it may be discovered that some of the fruit is in danger of being crushed or pinched between the cover and the top edges and sides and ends of the box, in which event the operator must be able to stop the further downward movement of the cross head 17 and permit this cross head to re-elevate while the operator adjusts the fruit within the box. This may be accomplished by providing a motor-reversing mechanism, as hereinafter described. However, should the pressing operations be accomplished without mishap or danger of injury to the fruit, the continued downward movement of the press head 17 will cause the nail punches 19 to continue their downward movement after the chuck frames 28 and 54 have been stopped by the engagement of the cover ends with the box ends and the complete nailing operation may then be completed by the continued downward movement of the cross head 17.

It will be observed, however, that as soon as the pressing operations are completed and the nailing operations start,—that is as soon as the chuck frames 28 and 54 have sprung the cover ends into contact with the box ends, and therefore cannot move downwardly any further, the nailing operations must continue to completion.

For this reason it is necessary that the operator be enabled to release the foot pedal 75 and stop the motor 57 at any time prior to the completion of the pressing operations, i. e., prior to the time the cover ends are actually brought into contact with the box ends, while as soon as the nailing operations are started the operator must not be enabled to thereafter stop the motor 57, since, at the end of the cycle of operations, that is, when the cross head 17 has been re-elevated to its uppermost position, the motor must be instantly stopped with the machine parts in their normal elevated position, and I prefer to arrange the control pedal 75 in such manner that the operator may release the same at any time after the start of the nailing operations without stopping the motor, thus insuring that even though the operator may release the pedal during the nailing operations the machine will continue to perform its work until the nailing operations are completed and the cross head 17 is again in its elevated position. For this reason I provide the low level 97 of the cam 95 as extending throughout that portion of the revolution of the shaft 96 as will correspond to the ordinary pressing operation; that is, this low level of the cam will extend throughout that portion of the movement of the cross head 17 which is required to bring the cover ends down into contact with the box ends.

While the low level 97 of the cam 95 is presented to the roller 100 of the foot lever 76, the foot lever 76 may be released and by reason of the spring 79 will return to its normal, or switch-open position. However, the high level 98 of the cam 95 extends throughout the remaining portion of the periphery of the cam, starting at the point in the revolution of the shaft 96 at which the pressing operations should be complete and the nailing operations should start. When the high level 98 of the cam is presented to the roller 100, release of the pedal 76 by the operator will not return the foot lever to its switch-open position, this lever being held depressed by the high level 98 of the cam until the rotation of the shaft 96 has been completed, at which time all of the parts of the machine are again in their normal positions, as shown in Figs. 1 and 2.

However, as hereinbefore explained, if during the pressing operations it is discovered that the fruit is in danger of being crushed or bruised or that the box is liable to be damaged because it is not properly centered, or has some defect, the operator must be enabled to stop the machine and to reverse the movement of the cross head 17 to permit the operator to correct the defect and avoid the damage. For this reason I have provided a second switch 101 (Fig. 1), preferably arranged in the same case 102 which houses the switch 74 and preferably lying immediately below the pivoted plate 78 but on the opposite side of the pivot thereof. The switch 101 is connected in circuit with the motor 57 in such manner that when this switch is closed current is supplied to the motor in such manner as to cause reverse rotation of the motor. The switch 101 is arranged to be actuated by a reversing pedal 103 similar in general construction to the pedal 75 in that the pedal 103 constitutes the extending end of a reversing foot lever 104 (see Fig. 8), the rear end of which is formed in a relatively T-shape, the head 105 of the T constituting a pivotal support for the foot lever 104 by engaging the rod 77.

It will be understood that the foot pedal 103 will only be actuated to reverse the motor 57 when it has been discovered that injury is likely to occur to the fruit or to the cover, at which time the foot pedal 75 will have been released, and it is necessary that the depression of the foot pedal 103 shall release the brake 83 from the motor shaft in the same manner as though the foot pedal 75 had been depressed, and for this purpose I provide an outstanding lug 106 upon the foot lever 104 which extends immediately above a second lever 107 corresponding in all respects to the lever 88.

An adjusting screw 108 may be provided in the lug 106 to make contact with the lever 107 so that when the pedal 104 is depressed the lever 107 will be depressed and will rock the shaft 77 in the same direction and to substantially the same extent as this shaft is rocked by actuation of the foot pedal 75. Thus the brake-shoe 83 will be withdrawn from the brake drum 82 at the time that the pedal 103 closes the reversing switch 101.

Since at any time during the pressing operations,—that is, during the first portion of the cycle of operations of the cross head 17, the pedal 103 must be free to be depressed to reverse the motor, but when the nailing operations are started the reverse operations of the motor must not be permitted, I provide a second cam 109 on the shaft 96 which has a low level 110 extending throughout a portion of its periphery, so arranged, relative to the low level of the cam 95, as to present its surface to a roller 111 formed upon an extending end of the head 105 of the T-shaped reversing lever 104. Thus during the time at which the low level 97 of cam 95 is presented to roller 100 on foot lever 76—(that is during the entire pressing operations), the low level 110 of the cam 109 will be presented to its roller 111, leaving the pedal 103 free to be depressed to reverse the motor at any time.

The cam 109, however, is provided with a high level 112 which will be presented to the roller 111 at about the same time that the high level 98 of the cam 95 is presented to its roller 100 so that at the time the foot lever 76 is prevented from returning to its switch-open position the foot lever 104 and its pedal 103 will be positively prevented from operating to reverse the motor.

By referring particularly to Fig. 6 it will be understood that when the shaft 96 has been moved through one complete cycle of operations the high level 112 of the cam 109 will be just ready to pass the roller 111 while the high level 98 of cam 95 will have just passed the roller 100. Thus at the end of the cycle of operations foot lever 76 is free to return to switch-off position, while the reversing foot lever 104 is prevented from being operated until after the start of the next cycle of operations.

Since in the packing of certain articles it may be desired to employ the same machine for applying lids to boxes of one height and also to boxes of another height, I prefer to adjust the machine to apply the lids to boxes of the greatest height when the nailing table 11, 12 and 13 is in its normal or lowermost position, and to provide means for lifting the nailing table to an elevated position whenever boxes of a lesser height are to be lidded in the machine. As hereinbefore explained, the nailing table 11, 12, and 13 is mounted upon the bars 9 which are slidably engaged in uprights 7 and 8. A cross bar or rod 113 is secured between the bars 9 by which force may be exerted to elevate the table 11, 12 and 13.

I prefer to cause the table 11, 12, and 13 to be elevated by power mechanism, which power may be supplied from the motor 57 upon each operation of the machine, as by extending the levers 67 and 72 forwardly of the machine to constitute arms 114 on the lever 67 and 115 on the lever 72, respectively, which may be employed to perform the table-elevating operations.

By referring particularly to Figs. 1, 2, and 10, it will be observed that upon each of the uprights 7 and 8 I provide a forwardly extending bracket 116 in which is journaled a shaft 117 extending across the front of the machine. Near the right-hand end of the shaft 117 I pivotally mount a link 118 which is in turn connected as at 119 to a second link 120. At the opposite side of the machine a similar link construction, including a link 121, is pivoted upon the shaft 117 and is connected at 122 to a second link 123. The links 120 and 123 are interconnected across the front of the machine by means of a cross bar 124 so that assembly of the links 118—120 and 121—123 at opposite sides of the machine are tied together as a single unit. The links 118—120 and 121—123 form a folding elevator mechanism which, when the machine is operating only upon boxes of the greatest height for which the machine is designed, may be folded as indicated in Figs. 1 and 2, out of the path of movement of the extending ends 114 of the lever 67.

However, when it is desired to cause the nailing table to be elevated to the position shown in Fig. 10, all that is necessary is to lift the cross bar 124 to the position shown in Fig. 10, engaging the ends of links 120 and 123 with the cross head 113 extending between the bars 9 for the table 11, 12, and 13. Preferably, the ends of the links 120 and 123 are provided with a spring clip 125 to engage above the cross rod 113 to hold the link assemblies in engagement therewith. When the link assemblies have been moved to the operative position shown in Fig. 10, it will be observed that the links 118 and 121 lie in the path of movement of extending ends 114 and 115 of the levers 67 and 72 and if desired these extending ends of the levers may be provided with rollers 126 to form a roller bearing at this point of engagement. Thus when boxes of reduced height, for instance one-half the height of the normal box to be used on the machine, is placed upon the nailing table 11, 12, and 13, the link assemblies may be moved into the position shown in Fig. 10 to engage the cross rod 113. Then upon the depression of the pedal 74 to move the cross head 17 downwardly the nailing table 11, 12, and 13 will be simultaneously moved upwardly toward the approaching cross head 17. By properly selecting the length of the links 118—120 and 121—123, the amount of upward movement of the nailing table may be made any desired value to accommodate a predetermined reduced height box.

After the reduced height boxes have been lidded and it is desired to continue the lidding of normal sized boxes, the link assemblies may be disconnected from the cross arm 115 and folded out of the way, thus returning the machine to its normal position upon normal sized boxes.

While the lidding machine thus far described may be employed for applying lids to boxes and for securing these lids to the boxes, it may also be desired to have a strap across the center of the box and this operation may be performed in a separate machine such as that illustrated and described in the United States Letters Patent No. 1,777,474 issued to George D. Parker, or a strapping head may be applied directly to the machine herein described to be actuated by movement of the cross head 17 to thus apply the straps to the boxes, while they remain in this machine.

I have illustrated a strapping mechanism particularly in Figs. 1, 2, and 4 as comprising a press-shoe 130 which may be, and preferably is, formed of a pair of plates 131 and 132 extending parallel to each other and transversely of the nailing table 11, 12, and 13, these plates being spaced apart by suitable spacing members 133 and secured together by means of suitable bolts 134. The space between the plates 131 and 132 of the press-shoe is preferably just sufficient to accommodate therebetween a wire strap 135 which may be formed as illustrated and described in the patent to George D. Parker, No. 1,777,474 hereinbefore referred to as a length of wire, the ends of which are inturned as indicated at 136 and sharpened to constitute driving ends by which the straps may be secured to the box. The press-shoe 130 is mounted upon the cross head 17, as by means of a pair of outstanding lugs 137 and 138 formed upon the plate 131. Pivotally secured to the lug 137 is a link 139, the free end of which is pivotally secured as at 140 to a second link 141, the opposite end of which is secured to a downwardly depending lug 142 formed upon a cross strap 143 extending between and secured to the cross bars 20 and 25. Similarly the lug 138 has secured thereto a link 144, the free end of which is pivoted at 145 to a second link 146, the opposite end of which is secured to a downwardly extending lug 147 also secured to the cross strap 143.

Interposed between the pivot points 140 and 145 is a tension spring 148 similar in all respects to the tension spring 47 described with reference to the mounting of the chuckframe 28 so that the assembled toggle links 139—141 and 144—146 with the spring 148 constitutes a mounting for the press-shoe 130 by which downward movement of the cross head 117 applies downward force upon the press-shoe 130 until a predetermined resistance is built up in the protruding fruit and the cover of the box, after which the press-shoe 130 will not be moved to a further downward position but such pressure will be maintained upon the cover of a constant value during the continued downward movement of the cross head 17.

Means may be provided upon the press-shoe 130 for bending the ends of the strap 135 down over the side edges of the box-cover and for driving the pre-formed ends 136 into the side walls of the box to secure the strap thereto. This driving means is illustrated herein as comprising a driving element 149 pivoted as at 150 between the plates 130—131, constituting the press-shoe 130. One end of the driving element 149 extends upwardly above the upper limits of the plates 131—132 to connect with an operating link 151 which extends laterally of the machine to engage a bellcrank 152 pivoted at 153 upon a bracket 154 mounted upon a vertical bar 155 extending between the cross bars 20 and the lever 71. Similarly, a driving element 156 is pivoted at 157 between the plates 131—132, the extending end of which is connected by means of a link 158 to a second bellcrank 159 pivoted upon the same pivot 153 but arranged to operate reversely to the movement of the bellcrank 152. The driving elements 149 and 156 are normally held in their retracted positions, as shown in Fig. 4, by means of a suitable tension spring 160 interposed between upstanding ears 161 on link 151 and link 162 on link 158.

I prefer to employ the downward movement of the cross head 17 both as a means for applying pressure to the press-shoe 130 to compress the cover down upon the box during the time the strap is applied thereto, and also for the purpose of providing such power as may be necessary to bend the ends of the strap around the edges of the box and to drive the ends of the strap into the box. For this purpose I employ the movement of the bracket 154, which, being secured to and movable with the cross head 17, is moved downwardly through the same distance as the cross head 17. The bracket 154, mounting the two bellcranks 152 and 159, are provided at their lower ends with a pair of rollers 163 and 164, respectively, which extend toward each other in such manner that under the force exerted by the spring 160 bring the rollers 163 and 164 into engagement with each other. Mounted upon any suitable stationary portion of the machine, as upon an angle brace 165 constituting one of the braces employed for the frame of the machine, I mount a wedge 166 substantially aligned with the meeting faces of the rollers 163 and 164 so that as the cross head 17 moves downwardly bearing the bellcranks 152 and 159 downwardly, they engage the wedge 166 and are separated by it to move the link 151 forwardly of the machine, and the link 158 rearwardly of the machine, to swing the driving elements 149 and 156 about their pivots. In order that the inward movement of the driving elements 149—156 shall not crush or injure the contents of the box, or the box, I prefer to mount the wedge 166 by suitable yielding means, which, while it will exert sufficient pressure to insure the complete driving of the strap ends into the box, will permit a yielding of the forces exerted upon the driving elements should the overpack of the fruit be of abnormal height. This spring mounting is illustrated in Fig. 4 as constituting a spring 167 surrounding a post 168, the upper end of which constitutes the mounting for the wedge 166, while the lower end of the post 168 extends through a hole 169a, the bracket 169 being held against removal therefrom by means of a head 170 formed upon the post 168. The spring 167 engages the upper surface of the bracket 169 at one of its ends, while the opposite end of the spring engages a suitable adjusting nut 171 threadedly secured upon the post 168 so that by adjusting the nut 171 toward and away from the bracket 169 the compression force of the spring 167 may be given any desired value.

It will be noted from an inspection of Fig. 4 that the hole 169a is slightly larger than the diameter of the post 168 so that the post 168 may rock slightly relative to its bracket 169. This mounting of the wedge 166 permits this wedge to be moved slightly in a lateral direction relative to the machine so that should greater resistance be offered to the driving of one end of the strap into the box than is offered to the opposite driving end of the box, the wedge 166 may yield laterally of the machine and thus insure that sufficient pressure is exerted to complete the strap-applying operations without crushing or injuring the box. It will therefore be observed that I have provided a box-lidding machine in which a box-supporting table is provided, upon which a box may rest above which is mounted suitable pressing mechanism for pressing the lid into nailing position upon the box and driving mechanism for driving nails through the box lid or cover to secure the same to the box, the lid-pressing and nail-driving elements having movement relative to the box-supporting table, but in which the pressing and nailing operations are performed by one continuous movement of these mechanisms toward each other. Also, it will be observed that the movement of a single cross head is employed to perform both the pressing and the nailing operations by mounting the pressing elements and the nailing elements to yield relative to each other after the pressing operations have been completed but in which the forces exerted by the pressing elements are maintained at a constant value irrespective of the amount of such yielding movement.

It will also be observed that I have provided a machine in which lidding and pressing operations may be performed at a sufficiently low speed to permit the operator of the machine to correct any improper operations and to prevent damage to the fruit or the box during the pressing of the lid upon the box, but in which a rapid return of the parts to their normal box-releasing position may be accomplished to free the box from the machine without loss of time.

As illustrated herein, the strapping mechanism may include also a magazine or holder for a supply of straps which may automatically be fed from the holder into a position between the plates 131 and 132 in response to the operations of the machine in the same manner as described in the George D. Parker Patent No. 1,777,474. Such magazine is illustrated at 180, which is supported upon a bracket 181 secured to the left-hand plate 132 of the press shoe. Extending rearwardly from the plate 132 is a second bracket 182 which has a vertical extension 183 thereon constituting a bearing member in which is pivoted as at 184 a lever 185, the upper end of which brings a roller 186 in the path of movement of a cam plate 187 secured to the cross head 17. Thus whenever the strapping mechanism is actuated to apply a strap to a box, causing a relative motion between the press shoe 130 and the cross head 17, the engagement of the lever 185 by the cam plate 187 will cause actuation of the feeding mechanism, such as is shown and described in the said George D. Parker Patent No. 1,777,474.

It will therefore be observed that I have provided a machine for nailing covers to overfilled fruit and vegetable boxes and also for applying a strap across the center of the box by a single continuous reciprocatory movement of a cross head carrying lid-pressing devices for pressing the lids into nailing position on the box; lid-nailing mechanism for nailing the cover ends to the box ends; and cover-strapping mechanism for pressing the central portion of the cover down tightly upon the box and applying a wire or similar strap across the center of the cover to hold the central portion of the cover in tight relation on the box.

This cycle of operations includes the following steps:

(1) The drawing of a box into nailing position on the nailing table 11, 12, 13, and 14 to the position shown in dotted lines in Fig. 1, at which time the cross head 17 will be in its elevated position as shown in Figs. 1 and 2, holding the nail-driving mechanism and the strap-driving mechanism in their normal rest positions as shown in Figs. 1, 2, 3, and 4;

(2) The placing of the cover 49 into the machine in the dotted line position shown in Fig. 1;

(3) Depressing of the foot pedal 75 to close the motor switch, starting the cross head 17 on its downward movement, the cam 95 holding the foot pedal depressed until the cross head has completed its downward movement and has returned to the uppermost rest position, as shown in Fig. 1;

(4) The initial downward movement of the cross head 17 brings the tuckers 50 into contact with the fruit and then the box ends engage the tuckers to rotate them out of their position between the ends of the cover and the ends of the box;

(5) The movement of the cross head 17 continues downwardly to bring the nail chucks 32 into contact with the ends of the cover and to press these cover ends down into contact with the ends of the box, as shown in Fig. 3a, this movement being accompanied by movement of the cover-strapping mechanism also downwardly until the press shoe 130 contacts the center of the cover;

(6) Further downward movement of the cross head 17 moves the brackets 23, 24, and 143 downwardly without further downward movement of the nail chucks and press shoe supported respectively by these brackets. This further downward movement of the cross head 17 allows the toggle links 36, 38, 43, and 45 of the nail driving mechanisms to be extended to allow the nail drivers to pass downwardly through the chucks to drive the nails through the ends of the covers while holding sufficient pressure on the nail chucks to maintain the cover ends in contact with the box ends and at the same time the toggle links 139—141 and 144—156 yield to allow the levers 152 and 159 to be brought into contact with the wedge 166 to swing the strap drivers 149 and 156 downwardly and inwardly to press the ends of the strap down over the side edges of the cover and to drive the ends 136 thereof into the side walls of the box;

(7) The cross head 17 will be moved downwardly through a predetermined distance upon each operation of the machine, the nail chucks 32 and the press shoe 130 yielding to prevent crushing of the box or the center of the cover. Arrival of the cross head 17 in its lowermost position representing the extreme downward movement of the cranks 67 and 72, continued rotation of the motor causes the cross head 17 to move upwardly back to its rest position, the cross head being stopped in this rest position by the movement of the cam 98 away from the foot pedal lever 76, allowing the motor switch to be opened.

While I have shown and described the preferred embodiment of my invention, I do not wish to be limited to any of the details of construction shown herein, except as defined in the appended claims.

I claim:

1. In a box-lidding machine, means for supporting a box to be lidded, a cross head mounted above said supporting means, means mounting said cross head and said box-supporting means for movement toward and away from each other, lid-pressing means for engaging and pressing a lid toward a box on said box-support when said box support and said cross head are moved toward each other, means suspending said lid-pressing means from said cross head for yielding movement relative to said cross head, and means for exerting a force of a substantially constant value between said cross head and said lid-pressing means opposing said yielding movement in any position of said lid-pressing means relative to said cross head.

2. In a box-lidding machine, means for supporting a box to be lidded, a cross head mounted above said supporting means, means mounting said cross head and said box-supporting means for movement toward and away from each other, lid-pressing means for engaging and pressing a lid toward a box on said box-support when said box-support and said cross head are moved toward each other, means suspending said lid-pressing means from said cross head for yielding movement relative to said cross head, spring means for exerting a force between said cross head and said lid-pressing means opposing said yielding movement, and means for transmitting said force between said cross head and said lid-pressing means to maintain the effective value of the force transmitted between said lid-pressing means and said cross head substantially constant irrespective of the amount of said yielding movement.

3. In a box-lidding machine, means for supporting a box to be lidded, a cross head mounted above said supporting means, means mounting said cross head and said box-supporting means for movement toward and away from each other, lid-pressing means for engaging and pressing a lid toward a box on said box-support when said box support and said cross head are moved toward each other, means suspending said lid-pressing means from said cross head for yielding movement relative to said cross head, means for exerting a force of a substantially constant value between said cross head and said lid-pressing means opposing said yielding movement, and means for securing lids to said boxes upon continued movement of said cross head and said box-supporting means after said pressing means starts to yield.

4. In a box-lidding machine, means for supporting a box to be lidded, a cross head mounted above said supporting means, means mounting said cross head and said box-supporting means for movement toward and away from each other, lid-pressing means for engaging and pressing a lid toward a box on said box-support when said box support and said cross head are moved toward each other, means suspending said lid-pressing means from said cross head for yielding movement relative to said cross head, means for exerting a force of a substantially constant value between said cross head and said lid-pressing means opposing said yielding movement, and means carried by said cross head for securing lids to said boxes upon continued movement of said cross head and said box supporting means after said pressing means starts to yield.

5. In a box-lidding machine, means for supporting a box to be lidded, a cross head mounted above said supporting means, means mounting said cross head and said box-supporting means for movement toward and away from each other, lid-pressing means for engaging and pressing a lid toward a box on said box-support when said box-support and said cross head are moved toward each other, means suspending said lid-pressing means from said cross head for yielding movement relative to said cross head, and spring means for exerting a force between said cross head and said lid-pressing means opposing said yielding movement, means for transmitting said force through a vertical component and a horizontal component, and means for diminishing said vertical component as said lid-pressing means and said cross head approach each other.

6. In a box-lidding machine, means for supporting a box to be lidded, a cross head mounted above said supporting means, means mounting said cross head and said box-supporting means for movement toward and away from each other, lid-pressing means for engaging and pressing a lid toward a box on said box-support when said box-support and said cross head are moved toward each other, means suspending said lid-pressing means from said cross head for yielding movement relative to said cross head, spring means for exerting a force between said cross head and said lid-pressing means opposing said yielding movement, in all positions of said lid-pressing means relative to said cross head, means coupling said spring to said cross head and said lid-pressing means to distribute the force thereof through a horizontal and a vertical component, said coupling means acting to increase the force of said spring and to diminish the said vertical component to substantially compensate for the increased force of said spring as said lid-pressing means and said cross head approach each other to maintain the value of the force opposed in said yielding movement at a constant value in all positions of said lid-pressing means relative to said cross head.

7. In a box-lidding machine, means for supporting a box to be lidded, a cross head mounted above said supporting means, means mounting said cross head and said box-supporting means for movement toward and away from each other, lid-pressing means for engaging and pressing a lid toward a box on said box-support when said box support and said cross head are moved toward each other, means suspending said lid-pressing means from said cross head for yielding movement relative to said cross head, means for exerting a force of a substantially constant value between said cross head and said lid-pressing means opposing said yielding movement in all positions of said lid-pressing means relative to said cross head, said force exerting means including a pair of links forming a toggle joint connecting said lid-pressing means and said cross head, and a spring connected to said toggle joint opposing relative movement of said links.

8. In a box-lidding machine, means for supporting a box to be lidded, a cross head mounted above said supporting means, means mounting said cross head and said box-supporting means for movement toward and away from each other, lid-pressing means for engaging and pressing a lid toward a box on said box-support when said box-support and said cross head are moved toward each other, means suspending said lid-pressing means from said cross head for yielding movement relative to said cross head, means for exerting a force of substantially constant value between said cross head and said lid-pressing means opposing said yielding movement in all positions of said lid-pressing means relative to said cross head, and nailing means for securing lids to said boxes upon continued movement of said cross head and said box-supporting means after said pressing means starts to yield.

9. In a box-lidding machine, means for supporting a box to be lidded, a cross head mounted above said supporting means, means mounting said cross head and said box-supporting means for movement toward and away from each other, lid-pressing means for engaging and pressing a lid toward a box on said box-support when said box-support and said cross head are moved toward each other, nail chucks mounted on said lid pressing means, means suspending said lid-pressing means from said cross head for yielding movement relative to said cross head, nail punches carried by said cross head and operable through said nail chucks upon said yielding movement between said cross head and said lid-pressing means, and means for exerting a force of a substantially constant value between said cross head and said lid-pressing means opposing said yielding movement in all positions of said lid-pressing means relative to said cross head.

10. In a nailing machine, a nailing table for supporting work to be nailed, a cross head mounted above said nailing table, means mounting said table and said cross head for movement toward and away from each other, a nail chuck supporting frame, one or more nail chucks carried by the frame, means suspending said frame from said cross head for yielding movement relative to said cross head when said table and said cross head are moved toward each other to bring said chucks into predetermined compressive relation with work on said nailing table, one or more nail punches carried by said cross head and operating through said chucks upon a continued movement of said cross head after said chucks are brought to rest when said predetermined compressive relation has been attained, and means for exerting a force of a substantially constant value between said cross head and said chucks opposing movement of said cross head relative to said chucks after said chucks have come to rest upon said work.

11. In a nailing machine, a nailing table for supporting work to be nailed, a cross head mounted above said nailing table, means mounting said table and said cross head for movement toward and away from each other, a nail chuck supporting frame, one or more nail chucks carried by said frame, means suspending said frame from said cross head for yielding movement relative to said cross head when said table and said cross head are moved toward each other to bring said chucks into predetermined compressive relation with work on said nailing table, one or more nail punches carried by said cross head and operating through said chucks upon continued movement of said cross head after said chucks are brought to rest when said predetermined compressive relation has been attained, means for exerting a force of a substantially constant value between said cross head and said chucks opposing movement of said cross head relative to said chucks after said chucks have come to rest, said force exerting means including a pair of links forming a toggle joint connecting said chuck supporting frame and said cross head, and a spring connected to the toggle joint opposing relative movement of said links.

12. In a nailing machine, a nailing table for supporting work to be nailed, a cross head mounted above said nailing table, means mounting said table and said cross head for movement toward and away from each other, a nail chuck supporting frame, one or more nail chucks carried by said frame, means suspending said frame from said cross head for yielding movement relative to said cross head when said table and said cross head are moved toward each other to bring said chucks into predetermined compressive relation with work on said nailing table, one or more nail punches carried by said cross head and operating through said chucks upon a continued movement of said cross head after said chucks are brought to rest when said predetermined compressive relation has been attained, means for exerting a force of a substantially constant value between said cross head and said chucks opposing movement of said cross head relative to said chucks after said chucks have come to rest, said force-exerting means including, a spring, means for elongating the said spring as said chuck support and said cross head approach each other, and means for transmitting the force of said spring through a vertical component and a horizontal component, and means for diminishing said vertical component as said chuck support and said cross head approach each other.

13. In a machine for applying lids to boxes, a box-supporting table, lid securing means disposed above said table, means for moving said lid securing means and said table through a cycle of operations including moving said table and securing means toward each other at a predetermined speed to secure a lid to a box and moving said table and securing means away from each other at a higher speed to quickly free said box after a lid is secured thereto, said moving means including a shaft, means for rotating said shaft at a substantially constant speed, and means coupling said shaft to said table and to said securing means to translate said rotary movement into a reciprocatory movement utilizing more than one-half of a revolution of said shaft for reciprocatory movement in the first-named direction and the remainder of the revolution for the return movement in the other direction.

14. In a machine for applying lids to boxes, a box-supporting table, lid securing means disposed above said table, means for moving said lid securing means and said table through a cycle of operations including moving said table and securing means toward each other at a predetermined speed to secure a lid to a box and moving said table and securing means away from each other at higher speed to quickly free said box after a lid is secured thereto, said moving means including a shaft, means for rotating said shaft at a substantially constant speed, a lever fulcrumed at a point spaced from said shaft, means coupling said lever to said shaft to be oscillated by rotation of said shaft, and means coupling said lever to said table and to said lid securing means to relatively reciprocate the same.

15. In a machine for applying lids to boxes, a box-supporting table, lid-securing means disposed above said table, means for relatively moving said lid-securing means and said table through a cycle of operations including approaching movement at a predetermined speed to secure a lid to a box, and separating movement at a higher speed to quickly free said box after a lid is secured thereto, said moving means including a shaft and means for rotating said shaft at a substantially constant speed, a lever fulcrumed at a point spaced from said shaft, means coupling said lever to said table and to said lid-securing means to relatively reciprocate the same in response to oscillation of said lever, and means coupling said lever to said shaft for oscillating the lever in response to rotation of the shaft, comprising a crank secured to the shaft for rotation therewith and means slidably coupling said crank to said lever whereby said crank slides longitudinally on the lever as it oscillates the lever to increase the distance between the crank and the lever fulcrum during approaching movement of the table and lid-securing means and to decrease the distance between the crank and the lever fulcrum during separating movement of the table and lid-securing means.

16. In a machine for applying lids to boxes, a box-supporting table, lid-securing means disposed above said table, means for relatively moving said lid-securing means and said table through a cycle of operations including approaching movement of the lid-securing means and table at a predetermined speed to secure a lid to a box, and separating movement of the lid-securing means and table at a higher speed to quickly free said box after a lid is secured thereto, said moving means including a shaft, and means for rotating the shaft at a substantially constant speed, a lever having two arms, said lever being fulcrumed at a point spaced from said shaft, means coupling one of said arms to said table and to said lid-securing means to relatively reciprocate the same in response to oscillation of said lever, and means coupling said other arm of said lever to said shaft for oscillating the lever in response to rotation of said shaft, in which said means for coupling said shaft to said other arm comprises a crank secured to the shaft for rotation therewith, and means slidably coupling said crank to said other arm of said lever whereby said crank slides longitudinally on said other arm as it oscillates the arm to increase the distance between the crank and the lever fulcrum during approaching movement of the table, and lid-securing means and decrease the distance between the crank and the lever fulcrum during separating movement of the table and lid-securing means.

17. In a machine for applying lids to boxes, a box-supporting table and a lid-securing member disposed above said table, means for moving said lid-securing member downwardly to secure a lid to a box on said table and moving said lid-securing member upwardly to release the lidded box, comprising a lever and means for oscillating it, and means for elevating and lowering said table in synchronism with the movements of said lid-securing member comprising a stationary base and a toggle link mechanism connecting said table to said base, and means on said toggle link mechanism adapted to be intercepted by said lever and cause said toggle link mechanism to be moved by said lever whereby movement of said lever to lower the lid-securing means causes the lever to intercept said toggle link mechanism and extend the latter to raise said table.

18. In a machine for applying lids to boxes, a box-supporting table, lid-securing means disposed above said table, means for moving said lid-securing means through a cycle of operations including a first movement toward said table at a predetermined speed to secure a lid to a box and upward movement away from the table at higher speed to quickly free the box after a lid is secured thereto, said moving means including a shaft, means operating said shaft at a substantially constant speed, a lever fulcrumed at a point spaced from said shaft, means coupling said lever to said shaft whereby the lever is moved slowly in a first direction to lower said lid-securing means and then rapidly in the other direction to raise said lid-securing means, and means actuated by said lever for raising said table slowly in response to slow movement of said lever in said one direction to elevate a box toward said lid-securing means and for lowering said table rapidly in response to rapid movement of said lever in said other direction for releasing the lidded box.

19. In a nailing machine, a nailing table, and a nailing head disposed above said table, means for moving said nailing head downwardly to nail a workpiece on said table and upwardly to release the workpiece comprising a lever and means for oscillating it; and means for elevating and lowering said table in synchronism with the movements of said nailing head comprising a stationary base, a toggle mechanism connecting said table to said base, said toggle link mechanism being extensible to raise said table and collapsible to lower said table, and means for coupling said lever to said toggle link mechanism in response to movement of said lever whereby movement of said lever to lower the nailing head extends said toggle mechanism to raise the table.

20. In a machine for applying lids to boxes, a box-supporting table, lid-securing means disposed above said table and means for moving said lid-securing means downwardly to secure a lid to a box on said table and upwardly to release the lidded box, comprising a lever and means for oscillating it; a supporting base for normally supporting said table in a first lower position, means for elevating said table into a second elevated position comprising a pair of toggle links hingedly connected together and one of said links being secured to said supporting base and the other toggle link being releasably, hingedly attachable to said table, one at least of said toggle links lying in the path of movement of said lever when said other toggle link is hingedly attached to said table whereby movement of said lever during lowering movement of said lid-securing member extends said toggle links to elevate said table, said toggle links being movable out of the path of said lever when said other link is disconnected from said table, whereby said table remains in lowermost position during lowering movement of said lid-securing means.

HERBERT E. TWOMLEY.